US008936070B2

(12) United States Patent
Geskes et al.

(10) Patent No.: US 8,936,070 B2
(45) Date of Patent: Jan. 20, 2015

(54) DEVICE FOR COOLING A GAS FLOW OF AN INTERNAL COMBUSTION ENGINE

(75) Inventors: Peter Geskes, Ostfildern (DE); Bernd Grünenwald, Nürtingen (DE); Wolfgang Knödler, Waiblingen (DE)

(73) Assignee: Behr GmbH & Co.KG, Stuttgart (DE)

( * ) Notice: Subject to any disclaimer, the term of this patent is extended or adjusted under 35 U.S.C. 154(b) by 1365 days.

(21) Appl. No.: 12/373,335

(22) PCT Filed: Jul. 13, 2007

(86) PCT No.: PCT/EP2007/006237
§ 371 (c)(1),
(2), (4) Date: Jan. 12, 2009

(87) PCT Pub. No.: WO2008/006604
PCT Pub. Date: Jan. 17, 2008

(65) Prior Publication Data
US 2009/0277165 A1 Nov. 12, 2009

(30) Foreign Application Priority Data

Jul. 14, 2006 (DE) .......................... 10 2006 033 056

(51) Int. Cl.
*F28F 27/02* (2006.01)
*F28D 7/10* (2006.01)
*F02B 29/04* (2006.01)
*F02M 25/07* (2006.01)
*F28D 21/00* (2006.01)
(Continued)

(52) U.S. Cl.
CPC ............ *F28D 7/106* (2013.01); *F02B 29/0418* (2013.01); *F02B 29/0462* (2013.01);
(Continued)

(58) Field of Classification Search
USPC ........ 165/72, 73–75, 101, 103, 159; 123/563, 123/568.12, 41.01; 60/320, 321, 599, 605.2
See application file for complete search history.

(56) References Cited

U.S. PATENT DOCUMENTS 4,685,292 A * 8/1987 Brigham et al. ................ 60/320
4,986,349 A 1/1991 Ono
(Continued)

FOREIGN PATENT DOCUMENTS

DE 195 08 570 9/1996
DE 198 41 927 3/2000
(Continued)

OTHER PUBLICATIONS

Japanese Office Action, Application No. 2009-518800, mailed Feb. 14, 2012.

*Primary Examiner* — Cheryl J Tyler
*Assistant Examiner* — Orlando E Aviles Bosques
(74) *Attorney, Agent, or Firm* — Leydig, Voit & Mayer, Ltd.

(57) ABSTRACT

A device for cooling a gas flow of an internal combustion engine includes a housing, an inlet and an outlet for a gas of the internal combustion engine, which is to be cooled, an inlet and an outlet for a liquid coolant, a heat exchanger for heat transfer between the gas and the coolant, a first wall section of the housing, wherein the first wall section is arranged between the coolant and the gas flow, and a second wall section of the housing, wherein the second wall section is arranged between the coolant and the atmosphere, wherein the first wall section and the second wall section are integrally formed in one piece.

11 Claims, 13 Drawing Sheets

(52) U.S. Cl.
CPC ....... *F02M25/0729* (2013.01); *F02M 25/0737* (2013.01); *F02M 25/0714* (2013.01); *F28D 21/0003* (2013.01); *Y02T 10/121* (2013.01); *Y02T 10/146* (2013.01); *F28F 2255/16* (2013.01)
USPC .......... 165/103; 165/72; 165/73; 165/74; 165/75; 165/101; 165/159; 60/320; 60/321; 60/599; 60/605.2; 123/563; 123/568.12; 123/41.01

(56) References Cited

U.S. PATENT DOCUMENTS

| | | | |
|---|---|---|---|
| 5,794,689 A | 8/1998 | Ghiani | |
| 5,964,281 A * | 10/1999 | Voss et al. | 165/144 |
| 6,141,961 A * | 11/2000 | Rinckel | 60/320 |
| 6,374,598 B1 | 4/2002 | Neuschwander | |
| 7,661,415 B2 * | 2/2010 | Nakamura | 123/568.12 |
| 2003/0015184 A1 | 1/2003 | Klipfel et al. | |

FOREIGN PATENT DOCUMENTS

| | | |
|---|---|---|
| DE | 199 36 241 | 2/2001 |
| DE | 10 2004 033 704 | 2/2006 |
| EP | 0 162 638 | 11/1985 |
| EP | 1 277 945 | 1/2003 |
| FR | 2 545 594 | 11/1984 |
| JP | 63-127298 A | 5/1988 |
| JP | 1-123078 U | 8/1989 |

* cited by examiner

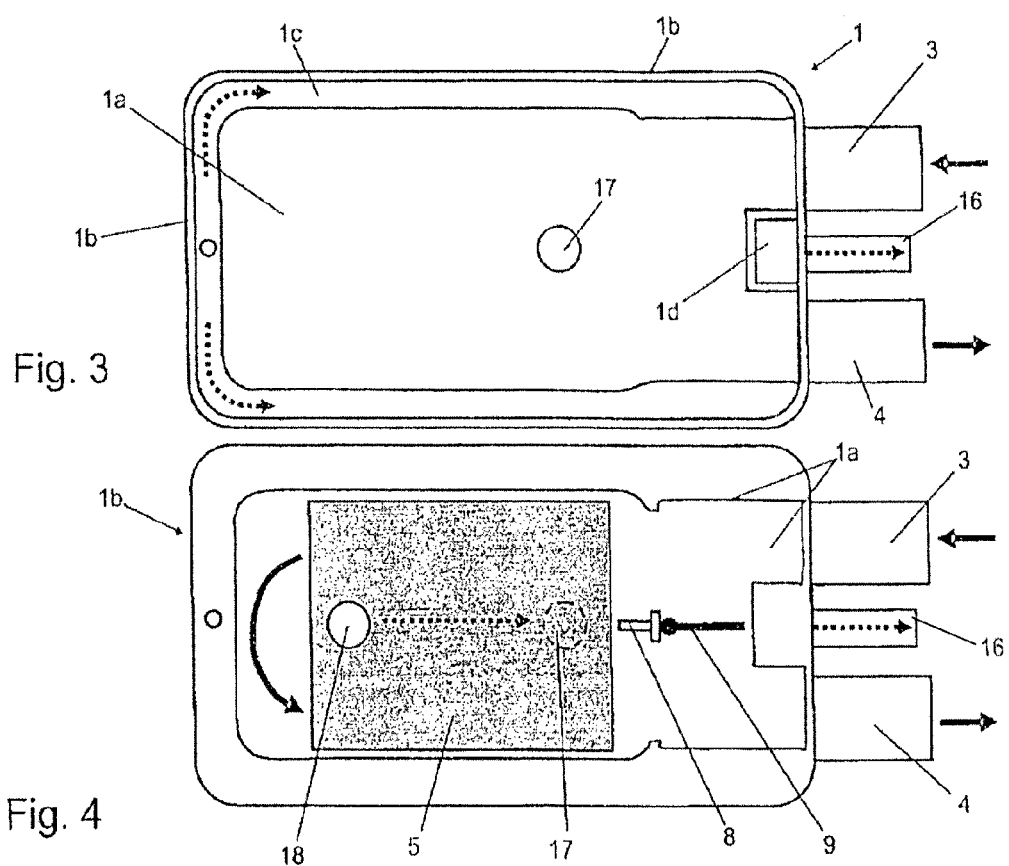

A   Coolant transfer to housing via cover
B   Double walled (with coolant cooling)
C   Coolant transfer to the coolant side from the inside to the outside A   Coolant transfer to housing via cover
B   Double walled (with coolant cooling)
C   Coolant transfer to the coolant side from the inside to the outside A     Coolant removal through coolant medium connection located at the bottom

DEVICE FOR COOLING A GAS FLOW OF AN INTERNAL COMBUSTION ENGINE

The present invention relates to a device for cooling a gas flow of an internal combustion engine.

For reducing noxious substances, particularly in the case of diesel engines of passenger cars, there has been an increased use of recycling exhaust gas to the internal combustion engine, where the exhaust gas must be cooled before being recycled. Heat exchangers are known for this purpose; because of the high temperatures and the high corrosiveness of the exhaust gases, such exchangers comprise exchanger tubes made of stainless steels. Such exchanger tubes are connected via holding means, such as bottom pieces, to a housing that conveys the coolant; the manufacture of such a heat exchanger is generally expensive. Besides exhaust gas, gas flow also can also denote, in the sense of the invention, charge air, for example, from a turbocharger, and/or an exhaust gas-air mixture as well. These gas flows often require cooling before they are fed back to the internal combustion engine, to ensure the functioning and the degree of effectiveness of the internal combustion engine.

The problem of the invention is to provide a device for cooling a gas flow of an internal combustion engine that is cost effective and can be manufactured with low installation costs.

This problem is solved by the invention with a device for cooling a gas flow of an internal combustion engine. The device includes a housing, an inlet and an outlet for a gas to be cooled, an inlet and an outlet for a coolant, and a heat exchanger for transfer between the gas and the coolant. The housing includes a first wall section arranged between the coolant and the gas flow and a second wall section arranged between the coolant and environment, where the first and second wall sections are materially integrally formed in one piece. Because the two wall sections are materially integrally formed in one piece, the same single-piece component ensures, at least in some areas, the separation of the environment from the coolant as well as the separation of the coolant from the gas flow. This allows a particularly advantageous manufacture of the housing, because the latter, at least in the areas of the wall sections, no longer need be composed of several components, either by mechanical fastening using sealants or by soldering or welding. Forming materially integrally in one piece, in the sense of the invention, comprises a uniform, seamless manufacture of the housing part that comprises the two wall sections.

In an advantageous embodiment, the first and the second wall section of the housing are made of a light metal, particularly one based on aluminum. Aluminum is a material that lends itself easily to construction and in addition it can be shaped cost effectively. It is particularly preferable to form the housing part comprising the first and the second wall section as a cast part, particularly a die-cast part. This cost effective manufacture of a lightweight housing is made possible, particularly in the case of the cooling of the hot exhaust gas flow at least in the area of the exhaust gas inlet into the housing, above all because the aluminum is cooled directly by the, in particular liquid, coolant. The coolant can be, for example, the main coolant of the internal combustion engine and/or an additional coolant, particularly one that is cooled to the environmental temperature.

In an advantageous embodiment, the cast housing part presents a first mold removal side and a second mold removal side, where the first mold removal side is constructed for conveying the coolant, and the second mold removal side is constructed for conveying the gas. As a result, separation walls with complex shapes between coolant and gas can be manufactured in a particularly simple way, while at the same time using a simple casting process. In particular, a plurality of shapes are possible without requiring the use of expensive casting cores.

In an additional possible embodiment, a housing part that comprises the first and the second wall section is designed as an extrusion mold profile. Extruded sections can be manufactured particularly cost effectively, and they can have very complicated cross-sectional shapes. In addition, it has been found that precisely in the usual injection molding processes of aluminum alloys, it is possible to achieve a crystalline aluminum structure that presents a particularly good resistance to corrosion. As a result, the cooling of hot, corrosive, exhaust gas is easily possible. When using injection molding profiles, particularly for cooling exhaust gas, it is important to avoid a subsequent strong heating of the pressed profiles, for example, in a soldering furnace, because the desirable corrosion resistance properties may be lost in the process.

In an alternative embodiment, the first and the second wall section of the housing can be formed from a single-piece shaped metal part, which consists particularly of a stainless steel. Depending on the dimensioning of the housing with the wall sections, such a metal plate forming can be carried out by simple deep drawing, which constitutes a cost effective manufacture with little waste.

In a generally preferred embodiment, the housing comprises at least one cover part that is not integrally formed with the wall sections. It is advantageous to provide, on the cover part, sealants for sealing off the coolant and/or the gas. In the process, the cover part can be fastened to the remainder of the housing by screwing, for example. Alternatively or complementarily, the cover part can also be soldered in a sealing way to the remaining housing. If both the cover part and the housing consist of a light metal alloy based on aluminum, then such a soldering of a mechanically premounted heat exchanger can be done, for example, in a soldering oven. Depending on the design, a local soldering or welding process can also be used.

In the interest of a simple construction and manufacture, at least the inlet and/or the outlet of the coolant is arranged on the cover part.

It is particularly preferred for the cover part to have a channel for conveying the coolant, so that the cover part itself can be cooled. As a result, the cover part can also come in contact with the hot gas flow if it is produced from a light metal. In a simple and cost effective design, the cover part here has at least two, particularly three, successively arranged, plate-like elements, wherein the channel is formed by a recess in at least one of the plate-like elements. Such a layered structure of the cover part made of several plate elements is particularly space-saving and simple to manufacture. It is also preferred for the cover part here to have an overflow opening to connect the duct to the remaining housing. As a result, using only one coolant, both the cover part and also the remaining housing can receive throughflow and be cooled.

The exchanger means is constructed in an advantageous embodiment as a module that is connected particularly to the cover part. As a result, an inlet or outlet for the coolant can be provided on the cover part, also allowing preliminary testing to reduce waste in a simple way during manufacture.

In an example embodiment, the exchanger means is designed as a stack of disks, wherein the coolant can flow through the stack, and the gas around the stack. This results in a design of the exchanger means that is easy to manufacture; in addition, it presents a high exchange capacity with small construction size, and it can be integrated cost effectively and in a simple way in the housing of the device according to the invention.

Alternatively, the exchanger means can also be designed as a cast part, particularly a die-cast part, with a plurality of cooling ribs. As a result, the manufacture of the exchanger means becomes particularly cost effective. Moreover, the exchanger means can alternatively also have a tube bundle. It is preferred for the exchanger means to be designed as a module arranged in the housing. This allows, for example, the manufacture of the exchanger means from a stainless steel, which is associated with high operational reliability and high exchange capacity in a small construction space. In an alternative advantageous embodiment, the exchanger means can also be materially integrally formed in one piece with the first and the second wall section. This leads to a particularly cost effective manufacture with a particularly small number of individual parts and thus a high operating reliability. Usually the exchanger means here presents a plurality of ribs that are materially integrally formed in one piece with the first wall section, around which gas can flow, where the contact surface between the first wall and the gas is increased for the purpose of optimizing the cooling effectiveness.

In the interest of a compact design with high exchange capacity, the device is designed as a U-flow cooler. Depending on the requirements, it can also be alternatively an I-flow cooler. In the case of the I-flow construction, the device particularly preferably comprises a bypass channel, which in the case of I-flow coolers is usually provided separately next to the exchanger means for reasons of geometry, where, in U-flow coolers, the possibility of a bypass deflection of the gas from the inlet to the outlet usually exists in the inlet area of the U-flow heat exchanger.

In an additional detail improvement of the preferred embodiment, a valve member for the adjustable deflection of the gas flow is arranged in the housing. As a result, the means for deflection for bypass deflection, for example, are integrated in a modular fashion in the housing, which entails a compact design. Alternatively or complementarily, a valve member for the adjustable regulation of a total amount of gas flow is arranged in the housing. In a design that is particularly preferred, and optimized with regard to overall size and number of components, a deflection of the gas flow through the exchanger means or a bypass path can be adjusted via the valve member.

In the context of a first preferred variant of the invention, it has been found to be advantageous for the first and/or second wall section to be a cooled wall section. This can be achieved particularly by arranging both the first wall section and the second wall section immediately adjacent to the coolant, advantageously resulting in a cooling of both the first wall section and also of the second wall section.

For this purpose, it is possible, in particular, to arrange the first wall section preferably practically completely inside the housing. Moreover, it has been found to be advantageous for the second wall section to practically completely form an external housing wall of a housing part and/or of a housing. This means particularly that the second wall section completely forms, except for areas of the inlet and outlet of the gas to be cooled, an external housing wall of the housing part and/or of a housing. In the context of the above-mentioned variant, the housing can be constructed and manufactured in a particularly simple way, thus embodying the advantages of the concept of the invention.

In another preferred variant of the invention, which differs from the previous one, one can provide for the second wall section to form an external housing wall of a housing part and/or of a housing only in a first partial area. In particular, this applies only to a first partial area other than areas of the inlet and outlet of the gas to be cooled. In the context of the present variant, it has been found to be particularly advantageous if the first partial section is restricted substantially to those areas of a housing part and/or of the housing that are in contact with comparatively hot, particularly uncooled, gas. This relates preferably to inlet and/or bypass areas of a housing part and/or of a housing. The result is the advantage that the second wall section needs to be designed as a wall section that is adjacent to the coolant practically only in the first partial section that is provided in this variant. In other words, in this variant of the invention, measures are omitted for constructing the second wall section beyond the first partial section in order to construct the second wall section as a coolant-adjacent wall section. In principle, one section of the second wall section housing can also be arranged so it is located inside.

The above-mentioned variant of the invention has been found to be particularly advantageous in a second variant of the invention, in which the housing presents an additional third wall section. Advantageously, according to the second variant, the first wall section and the second wall section and the third wall section materially integrally form one piece according to the concept of the invention. This optionally results, in comparison to the first variant of the invention, in the—also preferred—advantage that the third wall section can be designed to be uncooled. The third wall section can thus be designed advantageously in a particularly simple way.

In the context of a further modification of the second variant of the invention, the third wall section can form an external wall housing of a housing part and/or of a housing in an additional, second partial area. It has been found to be advantageous for the second partial area to be restricted substantially to those areas of the housing part and/or of the housing that are in contact with comparatively cooler gas, particularly a cooled and/or partially cooled gas. This particularly concerns areas that are arranged adjacent to the exchanger means and/or deflection areas of a housing part and/or of a housing. In other words, it was recognized, in the context of the second variant of the invention, that there are areas of the housing parts and/or areas of the housing that do not necessarily have to be cooled, and therefore a corresponding third wall section can be designed simply in comparison to the second wall section.

The second wall section and the third wall section together can practically completely form an external housing wall of a housing part and/or of a housing. In other words, the second wall section and the third wall section can form, completely except for areas of the inlet and outlet of the gas to be cooled, an external housing wall of a housing part and/or of a housing. A section of the third wall section can also be arranged inside the housing.

In the context of the second variant of the invention, it has been found to be particularly advantageous for the third wall section to be constructed with a thinner wall than the second wall section. For example, it is possible to provide the second wall section with a wall thickness that corresponds approximately to the wall thickness of the first wall section. As explained above, it is possible, in principle, to construct the third wall section in an advantageously simpler way than the second wall section. According to the above-mentioned variant, it has been found particularly advantageous to save material by means of a thin-walled design, which also entails a weight advantage and a saving of overall space in the device of the above-mentioned type.

In a further embodiment of the device according to the invention, the housing can be a part of an intake module of the internal combustion engine. In particular, the housing according to the invention can allow such an integration of a gas cooler in the intake module, in a simple way. Thus, for example, the housing or also a cover part can be formed in one piece with the intake module. Intake modules of modern internal combustion engines are usually cast aluminum parts, so that, to optimize construction space and costs, it is desirable to integrate the cooling elements with the suction ducts of the internal combustion engine to form a joint module.

The invention is found to be particularly useful when using a heat exchanger in the form of an exhaust gas heat exchanger, and should be understood in this sense, and while the invention is described below in detail with reference to examples that concern heat exchange between the exhaust gas of an internal combustion engine and a coolant, it should nevertheless be clear that the concept as described here and as claimed is also useful in the context of other applications that fall outside of heat exchange between exhaust gas and coolant in the narrower sense, and applications that lie outside this field, such as heat exchange between a coolant and charge air and/or an exhaust gas and/or a charge air-exhaust gas mixture. For example, the concept presented could additionally be used for applications where, in comparison to the described applications, the flow paths of coolant and gas/exhaust gas/charge air are exchanged, i.e., the flow paths described below for coolant are available for gas/exhaust gas/charge air, and vice versa, the flow paths described for gas/exhaust gas/charge air can be made available for a coolant. This applies particularly to the embodiment examples of FIGS. 12, 13 and 14, which can be used in various applications.

In principle, the embodiment examples described below, particularly the embodiment examples according to FIGS. 12, 13 and 14, are also suitable because, as coolant, a vaporizable medium is provided in the flow paths of the coolant. In this case, the heat exchanger is constructed in the form of an evaporator. This can be particularly advantageous if the hot medium used in the flow paths for gas/exhaust gas/charge air releases its heat for the evaporation of the vaporizable medium, for example, water, a coolant, or other vaporizable liquids. Such a heat exchanger in the form of a cooler can preferably be used downstream of an exhaust gas turbine, advantageously on the low-pressure side of an internal combustion engine, to use the exchanged heat, for example, in a Rankine cycle. Similarly, such a heat exchanger can be designed according to the principle of a cooler as condenser. In this case, in the flow paths described below for coolant, i.e., in the externally located flow paths in the embodiment examples of FIGS. 12, 13 and 14, a condensable medium is conveyed, and a coolant medium for flow is provided in the flow paths, which are provided below for exhaust gas/gas/charge air, i.e., in the embodiment examples of FIGS. 12, 13 and 14, in the internal flow paths.

Embodiment examples of the invention will be described below in reference to the drawing. The drawing is not intended to represent the embodiment examples true to scale, rather, the drawing, where useful for the explanation, is made schematically and/or in a slightly distorted form. With regard to the teaching that can be seen directly in the drawing, reference is made to the pertinent state of the art.

Here, one must take into account that numerous modifications and changes regarding the form and detail of an embodiment can be made without deviating from the general idea of the invention. The characteristics of the invention that are disclosed in the above description, in the drawing as well as in the claims, either individually or in combination, are essential for further embodiments of the invention. In addition, the scope of the invention includes all designs having at least two of the characteristics disclosed in the description, the drawing and/or the claims. The general idea of the invention is not limited to the exact form or detail of the embodiments shown and described below, or limited to subject matter that would be limited in comparison to the subject matter claimed in the claims. The indicated range of measures should include values as boundary values within the mentioned limit, and they should be usable and claimable as desired.

Additional advantages and characteristics of the invention result from the embodiment examples described below as well as from the dependent claims.

Several embodiment examples of the invention are described below and explained in further detail with reference to the attached figures of the drawing.

FIG. 3 shows a coolant-side top view of a second embodiment example according to a first variant of the invention.

FIG. 4 shows a gas-side top view of the embodiment of FIG. 3.

Figure 1:
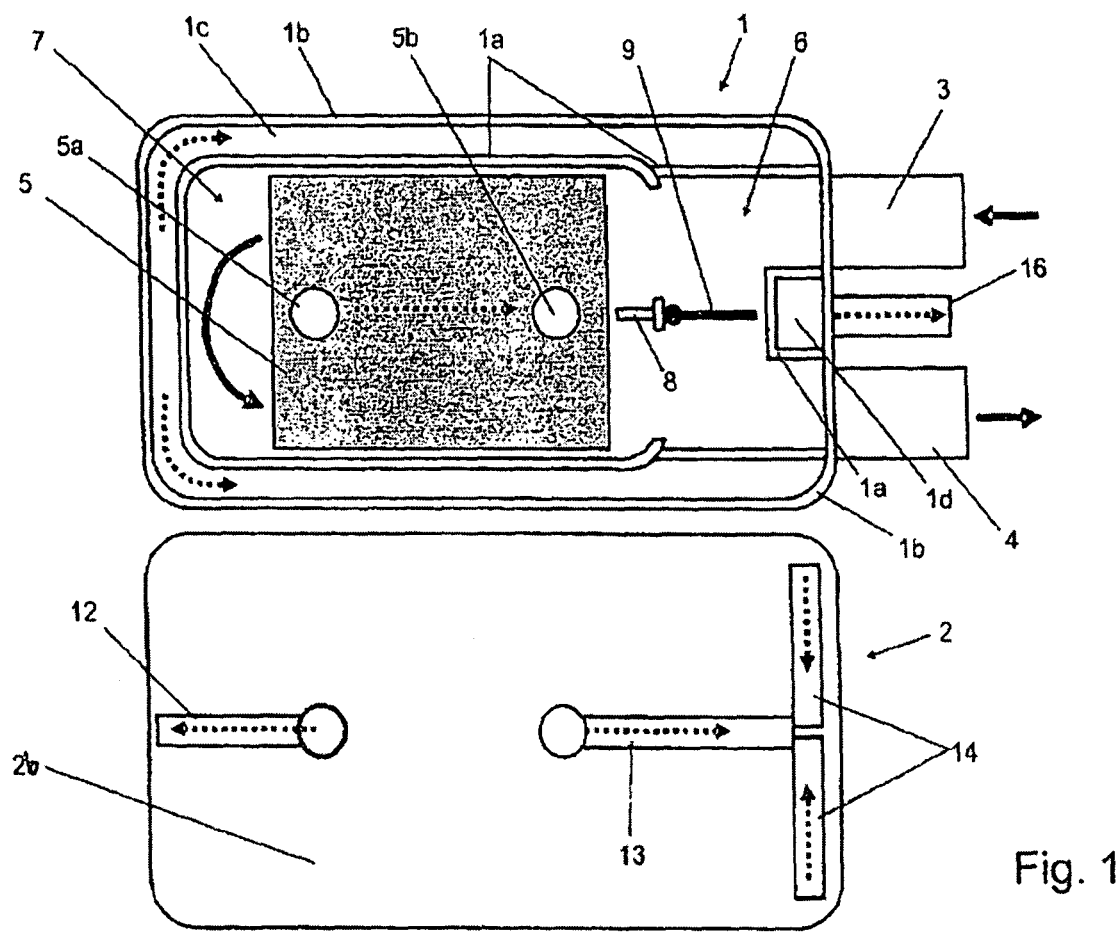
FIG. 1 shows a schematic representation of a first embodiment example according to a first variant of the invention with a separately represented cover part.

In the embodiment examples described below, functionally identical parts are labeled using the same reference characters. The flow arrows shown in the drawings, if the arrows are drawn with solid lines, refer to flows of the gas to be cooled, and, if they are drawn with broken lines, to coolant flows.

The first embodiment example according to FIG. 1 comprises a housing 1, which is die-cast from an aluminum alloy. In FIG. 1, the housing 1 is represented in the open form next to a cover part 2, where the cover part 2 is shown in a schematic cross-sectional view for the representation of coolant ducts that are arranged in the cover part 2.

The housing 1 comprises an inlet 3 and an outlet 4 for the gas flow of an internal combustion engine. The device or heat exchanger according to FIG. 1 serves to cool an exhaust gas flow 60, which is represented as an example in FIG. 17, and which is recycled for the reduction of noxious substances of an internal combustion engine 50 of a motor vehicle.

The housing 1 has a first, inner wall section 1*a*, and an outer wall section 1*b*, which runs, at some separation, around the first inner wall section 1*a*. The inlets and outlets 3, 4, which are represented as connection pieces, are arranged at perforations of the external wall 1*b*, and they open into a space that is enclosed on three sides by the first, inner wall. In this space, an exchanger means 5 is arranged, which is provided as a separate module within the inner wall section 1*a*. The exchanger means 5 is a cooling body through which a liquid coolant can flow by means of the connections 5*a*, 5*b*. Between the inlet and the outlet 3, 4, which are arranged next to each other on the same side of the housing 1, an inlet area 6 is provided within the first inner wall section 1*a* for the gas flow. On the other side—with respect to the gas flow—of the cooling body 5, a deflection area 7 is provided between the inner wall 1*a* and the cooling body 5. In the inlet area 6, a movable setting member 9 in the form of a setting clap is additionally provided on appropriately designed guide structures 8. By means of this gate valve 9, the exhaust gas stream can be conveyed, as desired, either directly from the inlet 3 to the outlet 4, or it can be guided so it flows through the cooling body 5. Thus, using the setting member 9, a bypass operation can be selected, which may be desirable depending on the operating condition of the internal combustion engine.

Between the inner wall section 1*a* and the outer wall section 1*b*, a small gap 1*c* remains through which coolant can flow. As a result, the inner wall section 1*a* is particularly cooled, which is necessary above all in the inlet area 6 due to the high temperatures of the exhaust gas flow, because the housing 1 consists of an aluminum alloy.

The housing 1 is materially integrally formed in a single-piece die-cast part with the inner wall section 1*a* and the outer wall section 1*b*.

A lower bottom 10 of the housing 1 can also be integrally formed with the wall sections 1*a*, 1*b* by die-casting. In the top view of FIG. 1, a one-side mold removal of the die-cast part would then be possible, where both the gas conveying area and also the coolant conveying area would be formed by the same casting mold side.

In a possible variant, the housing 1 with the wall sections 1*a* and 1*b* can also be a section of an extruded profile. In this case, the coolant-side bottom part 10 would be applied separately, where it have advantageously have, similarly to the cover part 2 described below, ducts to allow the throughflow of coolant, and thus the cooling of the bottom part 10 in the area of the contact with the gas flow. However, in this case, the wall section 1*a*, which separates the gas flow from the coolant flow, and the wall section 1*b*, which separates the coolant flow from the environment, are materially integrally formed in one piece.

The cover part 2, which forms an upper covering of the housing 1, is composed of a total of three plate elements 2*a*, 2*b*, 2*c* (see FIG. 2), which consist of aluminum, and are soldered together in laminae. Each one of the plate elements 2*a*, 2*b*, 2*c* has appropriate perforations to distribute the liquid coolant. The upper plate element 2*a* has a perforation for the connection of an inlet 11 for the coolant. The middle plate element 2*b*, which is shown in top view in FIG. 1, has ducts 12, 13, 14, into which the coolant flows in the plane of the cover part 2. The lower plate element 2*c* has perforations 15, by means of which a connection can be established between the ducts 12, 13, 14, to the exchanger means 5 on the one hand, and, on the other hand, to the coolant conveying spaces 1*c* of the housing 1 between the walls 1*a*, 1*b*.

Figure 2:
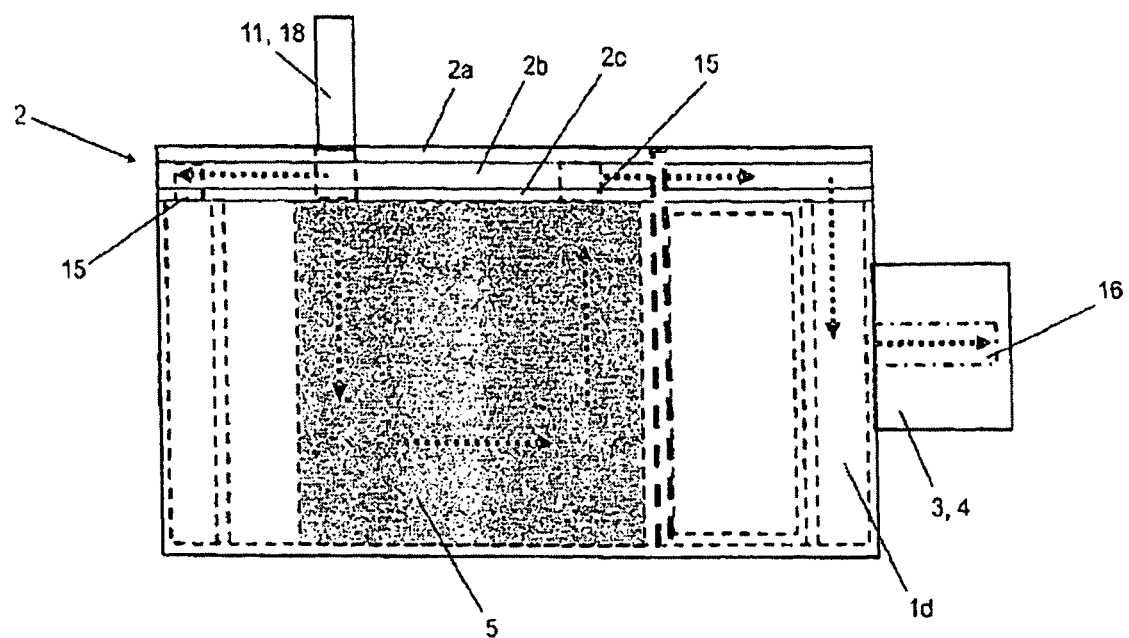
FIG. 2 shows a schematic top view of the embodiment of FIG. 1 from the side.
Figure 5:
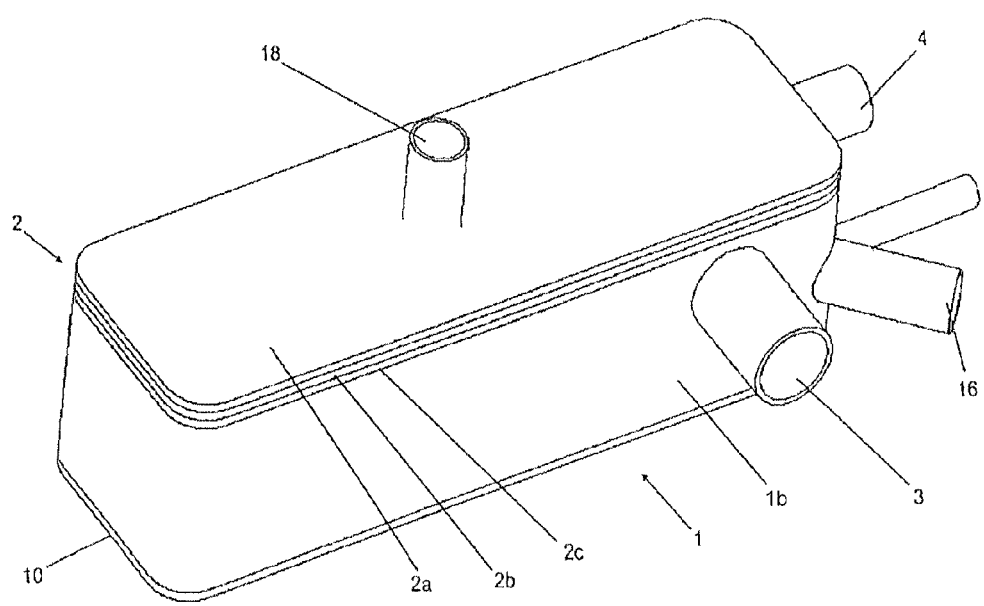
FIG. 5 shows a spatially schematic view of a third embodiment example according to a first variant of the invention.
Figure 6:
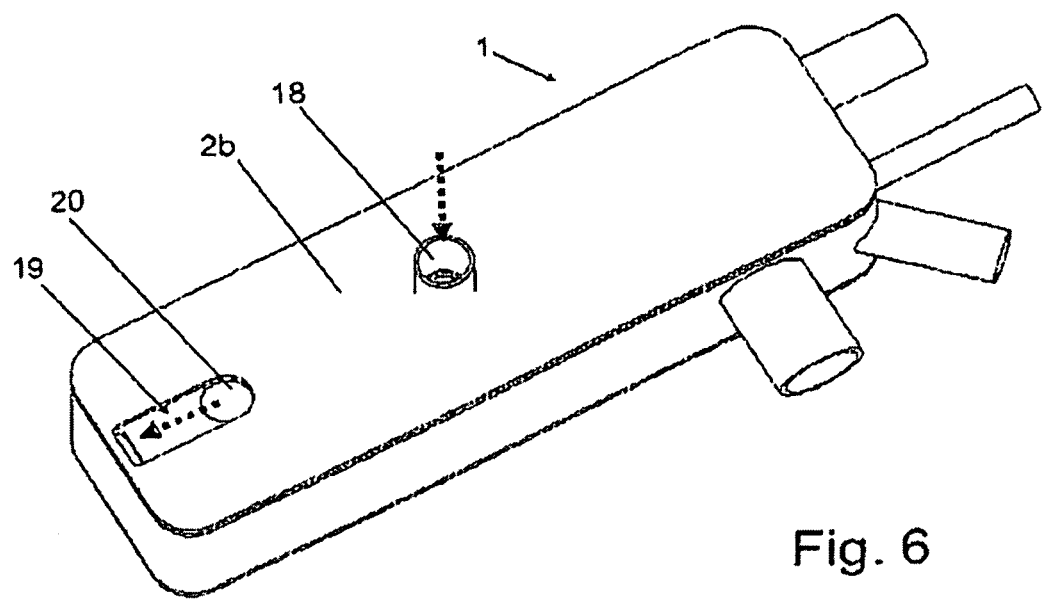
FIG. 6 shows the embodiment example from FIG. 5, omitting an uppermost plate element of a cover.
Figure 7:
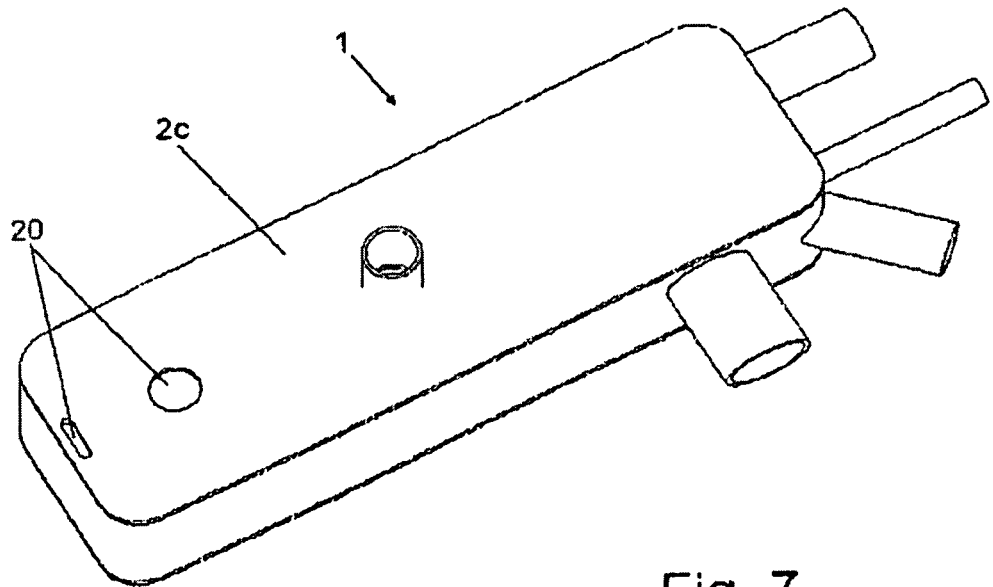
FIG. 7 shows the embodiment example of FIG. 6, omitting a middle plate element of the cover.

As the cross-sectional view according to FIG. 2 shows in particular, all the coolant flows via the inlet 11 and the perforation in the upper plate element 2*a* into the duct 12 of the middle plate element 2*b*, as well as through a congruent perforation of the lower plate element 2*c* into the exchanger means 5. After circulation in the exchanger means 5, the coolant passes through an additional perforation of the lower plate element 2*c* into the duct 13 of the middle plate element 2*b*, from which it is conveyed via the ducts 14 into a coolant conveying shaft 1*d* of the housing 1. This shaft 1*d* is connected to a connector 16 to remove the coolant from the housing 1. The shaft 1*d* is located in the inlet area 6 of the gas flow, and it is closed off at one side by the outer wall 1*b* in the immediate vicinity of the inlet 3 and outlet 4 of the gas flow. In this way, the temperature-critical area of the wall 1*b* is cooled.

The partial flow of the duct 12 in the middle plate element 2*b* is guided through a perforation 15 of the lower plate element 2*c* into a gap 1*c* that runs around the major part of the housing 1, so that as large as possible a part of the wall section 1*a* that is in contact with the gas flow is cooled by the coolant. Through appropriate perforations in the bottom plate element 2*c*, as well as the ducts 14 of the middle plate element 2*b*, this partial stream is also guided to the part 1*d*, so that all the coolant of the housing 1 leaves through the removal connector 16.

Figure 11:
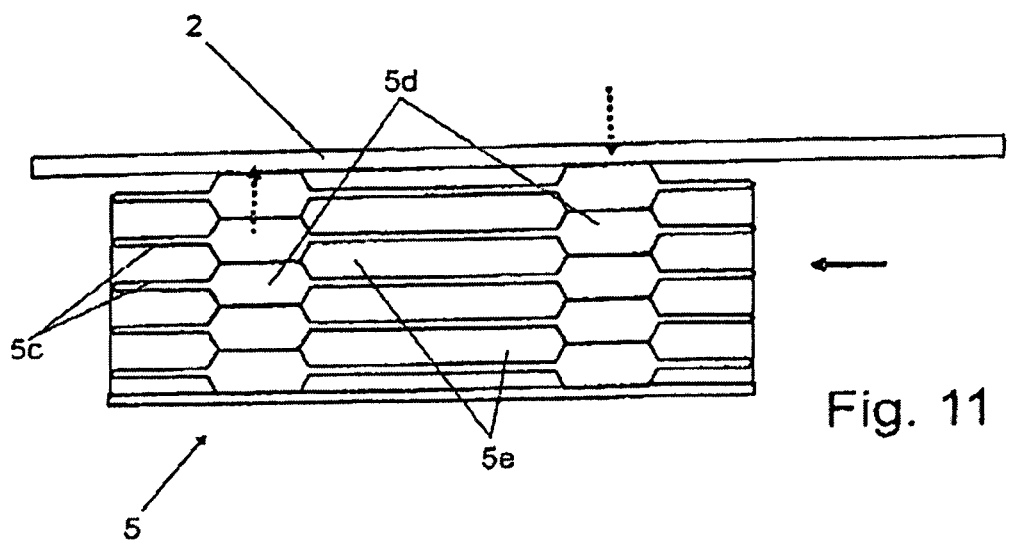
FIG. 11 shows a schematic top view from the side of an exchanger means of a cover arranged.

The exchanger means 5 here represents a separate module in front of the housing 1, where the module is connected to the cover part 2. An exemplary embodiment of the exchanger means 5 is represented in FIG. 11. The exchanger means 5 there is constructed in the form of a stack of disks 5*c*, similar to those known, for example, from stacked disk oil coolers. The stack of disks 5*c* overall forms a cavity 5*d* through which the coolant can flow, where plate-like drawn out patterns of the disks 5*c* form gaps 5*e*, through which the gas stream flows with maximum contact surface area. Such a stacked disk design can advantageously consist of shaped metal parts made of corrosion-resistant steel. In principle, the exchanger means 5 can also be manufactured from aluminum. In principle, the exchanger means 5 can also be materially integrally formed in one piece with the housing 1.

Depending on the design of the exchanger means, it may have, to improve the exchanger capacity, ribs, turbulence inserts, stamped structures, such as, for example, fins, which are arranged as needed on the coolant side and/or on the gas side.

In the second embodiment example according to FIG. 3, the same function and largely identical flow paths as in the first embodiment example are present, in principle. An essential difference compared to the first embodiment example is that the housing according to FIG. 3 and FIG. 4 is produced with a die-casting method using at least a two-part casting mold, where a first mold removal side of the housing 1 is assigned to the conveyance of the coolant, and a second mold removal side is assigned to the conveyance of the gas flow. The mold removal side of the coolant is represented in FIG. 3, and the mold removal side of the gas flow is shown in FIG. 4. Both on the coolant side and also on the gas side, a cover part (not shown) lies on the respective housing 1. The cover parts can be fixed in a sealed manner by means of gaskets and, for example, screw connections, or by laminar soldering.

Due to the design that deviates from the first embodiment example, the housing 1 of the second embodiment example comprises an intermediate bottom, which is materially integrally formed in one piece, extends parallel to the flow direction of the gas flow over the predominant portion of the housing 1, and is associated with the wall section 1a, because, on the one hand, it abuts against the coolant, and, on the other hand, against the gas flow. This intermediate bottom 1a has a perforation 17, by means of which the coolant can be conveyed from the coolant conveying housing side (FIG. 3) to the modular exchanger means 5. At this perforation 17, a seal is provided to seal off the gas flow against the coolant.

The coolant is fed in via an inlet connector 18, which passes through the gas-side cover, i.e., the cover that is attached in the view according to FIG. 4, and opens into the exchanger means 5. After the coolant has flowed through the exchanger means 5, it enters through the perforation 17 into the coolant-side space of the housing 1. The cover part that is associated with the side according to FIG. 3 has a sufficient separation from the intermediate bottom of inner wall section 1a, so that the coolant can flow over the entire surface of the intermediate bottom. It also flows through the gap 1c extending vertically in FIG. 3 between the wall sections 1a and 1b, so that the vertical partitions of inner wall section 1a between coolant and gas flow are also cooled. Similarly to the first embodiment example, a shaft-like cavity 1d is provided, which is arranged in the vicinity of the inlet and outlet 3, 4 of the gas flow on the external wall 1b. From this shaft 1d, as in the first embodiment example, the coolant is removed through a removal connector.

The housing 1 of the second embodiment example, in a variant, can also consist of a shaped metal part, particularly one made of stainless steel. The metal plate can, for example, be reshaped by simple deep drawing. The ratio of the depths of the structures to the height and width of the housing can be adapted appropriately to allow deep drawing.

An additional embodiment example is shown in FIGS. 5-10. This example has in common with the embodiment example according to FIGS. 3-4 that the housing 1 is manufactured in a casting process with a gas-side mold removal side (see view according to FIG. 8) and a coolant-side mold removal side (see view according to FIG. 9). Both on the gas side and also on the coolant side, a cover is arranged on the housing 1. The gas-side cover 2 consists, as in the first embodiment example, of three plate elements 2a, 2b, 2c. The upper plate element 2a has an inlet connector 18 for the coolant. The inlet connector 18 leads into the modularly designed exchanger means 5, which is fixed to the cover part 2.

An outlet of the coolant from the exchanger means 5 leads via the perforations 20 of the lowermost plate element 2c of the cover 2 into duct-like perforations 19 of the middle plate element 2b. The cover part 2 is cooled as a result of the flow through the ducts 19 (in FIG. 6, only a short duct is represented, as an example). Via the perforations 20 in the lower plate element 2c, the coolant flow is then conveyed further into the housing 1, where it flows for the purpose of cooling the wall sections 1a, 1b, through cavities 1c arranged between them.

As a modified embodiment, a valve member for controlling the gas stream by means of appropriate perforations is arranged in the housing 1 of the embodiment example according to FIGS. 5-10. The valve member comprises a valve gate 22, and a push rod 23 that is guided in a gas-tight way through the wall 1b, and connected to a drive M represented as an example in FIG. 15.

The valve member can be received by means of steel, ceramic or other inserts in the aluminum housing.

The valve gate, in the schematic representation, is a longitudinal cylinder which engages, in a central position, through two perforations of two wall sections 24, 25. In this central position (see FIG. 8), the throughflow of the gas flow is barred completely, and the gas flow must take a path either through the wall 24 then through the exchanger 5, or through the wall 25 and directly to the gas outlet 4. Depending on the movement of the slide valve 22 out of its central position in one direction or the other, it is possible to adjust both the magnitude and the flow path of the gas flow. In the case of the direct path from the inlet 3 to the outlet 4 through the wall 25, the operation is a bypass operation where the gas flow does not undergo any appreciable cooling.

Figure 10:
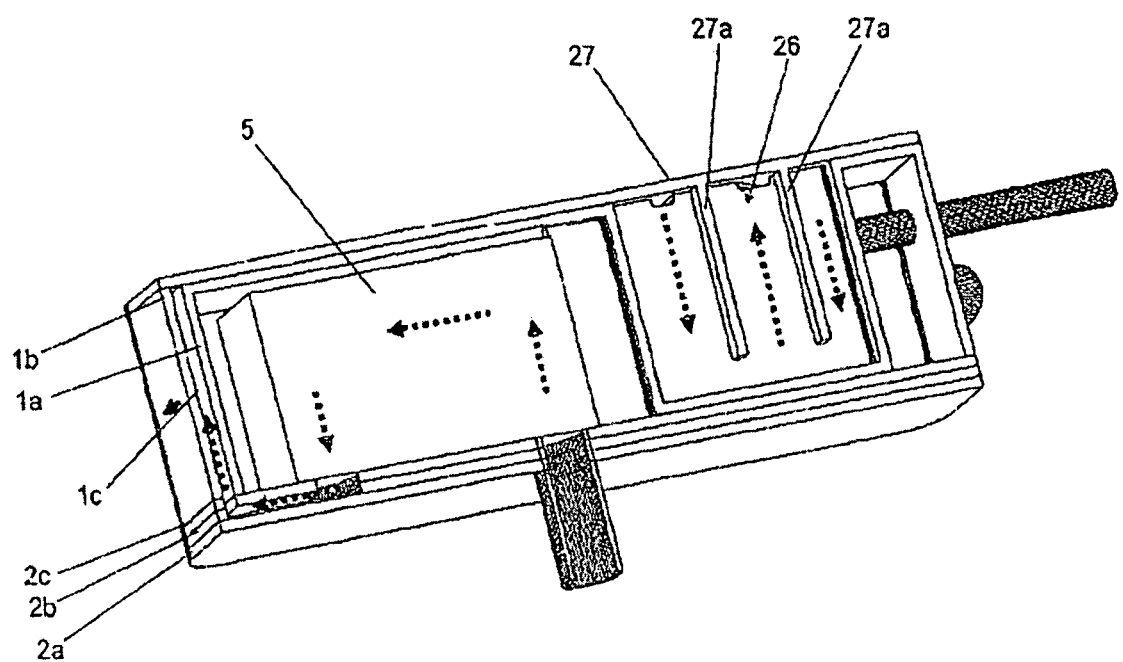
FIG. 10 shows a cross-sectional view of the device of FIG. 8 along the line A-A.

An additional advantageous detail of the embodiment according to FIGS. 5-10 is shown in the cross-sectional view according to FIG. 10. A separation bar 26, between the forward flowing and the returning gas flow, has a cavity on the coolant side, in accordance with the construction of the housing 1. On a coolant-side cover 27, deflection bars 27a extending into this cavity are formed. As a result, the coolant according to FIG. 10 undergoes multiple deflections in the hollow space, so that the gas-side separation bar 26 is cooled particularly well.

Because the coolant-side cover part 27 is not in direct contact with the gas to be cooled, it can, in principle, consist of plastic, even in the case of hot gases. On the other hand, it may also be an aluminum cover part, which, in the manner described above, can be fixed mechanically with seals, or it can be glued, or soldered laminarly.

The flow paths of the coolant can differ in the embodiments according to FIG. 1 to FIG. 10 as a function of the arrangement of the inlet, outlet and distribution ducts. It can flow first through the exchanger means and then through the housing, or vice versa. Alternatively or complementarily, a branching off of the flow can be provided, as a result of which a partial flow flows through the exchanger means, and another partial flow flows through the ducts leading to cooling the housing and the cover.

Figure 12:
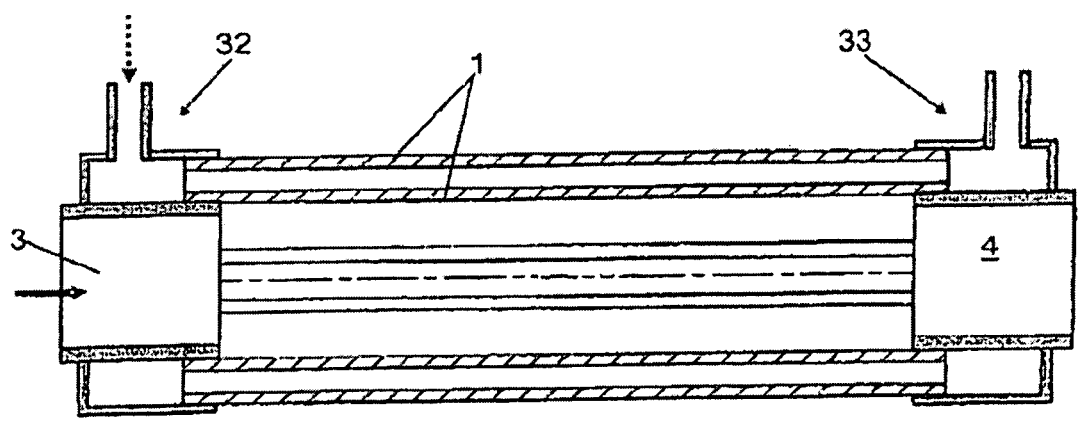
FIG. 12 shows a schematic cross-sectional view of an additional embodiment example.

An additional embodiment example of the invention is represented in FIG. 12. In contrast to the embodiment examples according to FIGS. 1-10, the heat exchanger is not a U-flow heat exchanger here, but an I-flow heat exchanger, in which the gas stream flows through the heat exchanger in the longitudinal direction, and the inlet connector 3 is arranged, with respect to the housing 1, on the opposite side of the outlet connector 4.

Figure 13:
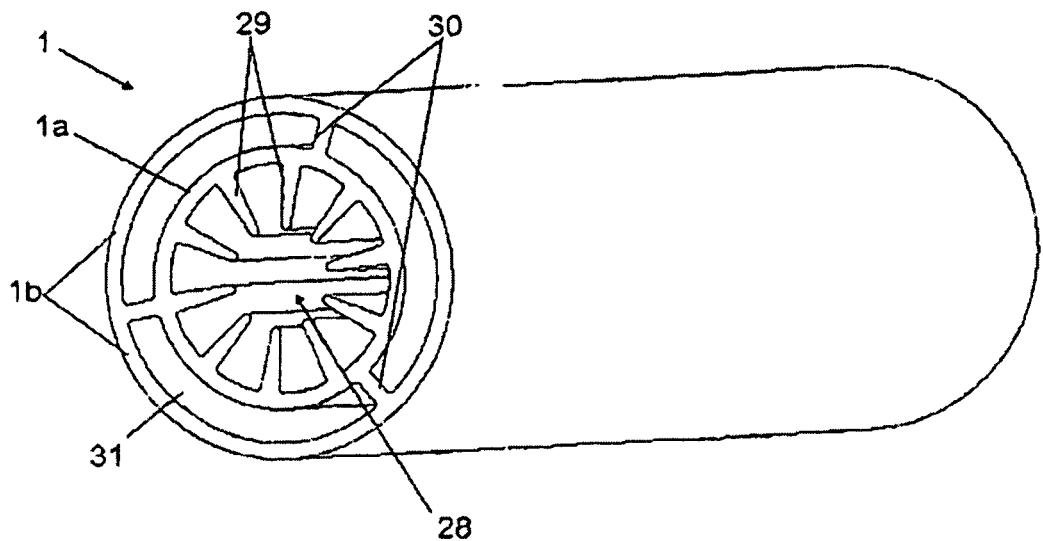
FIG. 13 shows a spatial view of a housing of the embodiment example of FIG. 12.

The housing 1 of the heat exchanger according to FIGS. 12 and 13 is materially integrally formed as a one-piece extruded section made of an aluminum alloy. The extruded section 1 comprises a central continuous chamber 28 to convey the gas flow, which is enclosed substantially circularly by a wall section 1a. From the first wall section 1a, rib elements 29 extend into the chamber 28, to increase the wall surface area to improve the heat exchange. The first wall section 1a is surrounded concentrically by a second wall section 1b, which forms an external wall of the housing 1. Several connection bars 30 connect the first wall section 1a to the second wall section 1b. Between the first wall section 1a and the second wall section 1b, the plurality of through-going ducts 31 are arranged to allow the throughflow of the coolant. The wall section 1b thus separates the coolant from the environment, and the wall section 1a, which is materially integrally formed in one piece with the wall section 1b, separates the gas flow from the coolant. At the ends of the housing 1, according to FIG. 12, an inlet-side connection area 32 and an outlet-side connection area 33 are respectively arranged.

The connection areas 32, 33 are glued to the housing 1, or soldered exclusively by local heating. It is also possible to use a screw connection in connection with sealants. It is important that the extruded section 1 is no longer completely heated during the installation, because studies have shown that extruded aluminum sections have a particularly good resistance to hot exhaust gases. This surprising effect could be explained by the temperature and pressure conditions of the crystal structure of the material that results at the temperature and pressure conditions of the injection molding. For a proper functioning with respect to corrosion resistance of the aluminum of the housing 1, it is important that no additional heating is carried out in the manufacturing process for the entire device.

An additional advantage of the embodiment according to FIGS. 12 and 13 results from the fact that the tubular, longitudinal housing 1 can be bent for adaptation to the construction space that is available.

Figure 14:
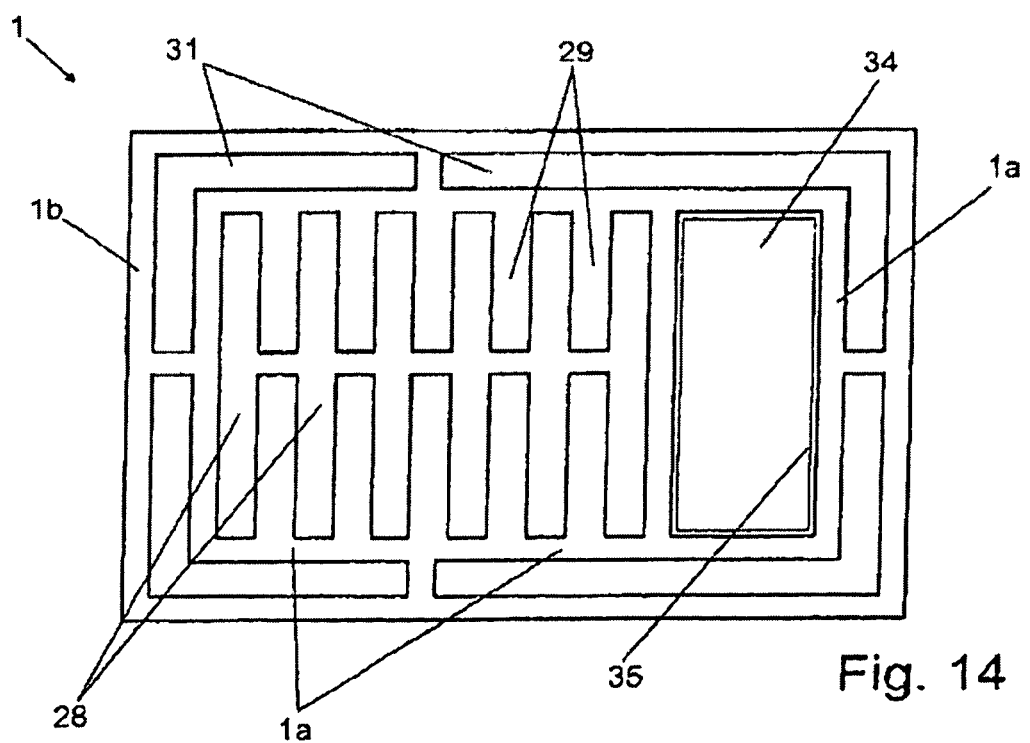
FIG. 14 shows a cross sectional view through a housing of an additional embodiment example.

A variant of the embodiment example of FIGS. 12 and 13 is represented in FIG. 14. A cross section through a modified housing 1 is shown. The modified housing is not round in cross section, but substantially rectangular. Between an outer wall section 1b and an inner wall section 1a, coolant ducts 31 are formed. The first wall section 1a comprises a gas duct 28, which is provided with rib elements 29 that protrude in the form of webs from the wall 1a to improve the cooling. Adjacent to the gas duct 28, a bypass duct 34 for conveying gas is provided in the injection molded profile. In the present example, the bypass duct 34 has an inner lining made of a refined steel metal plate 35 for better thermal insulation, because it is desirable to have as little cooling of the exhaust gas as possible as it flows through the bypass duct.

Figure 15:
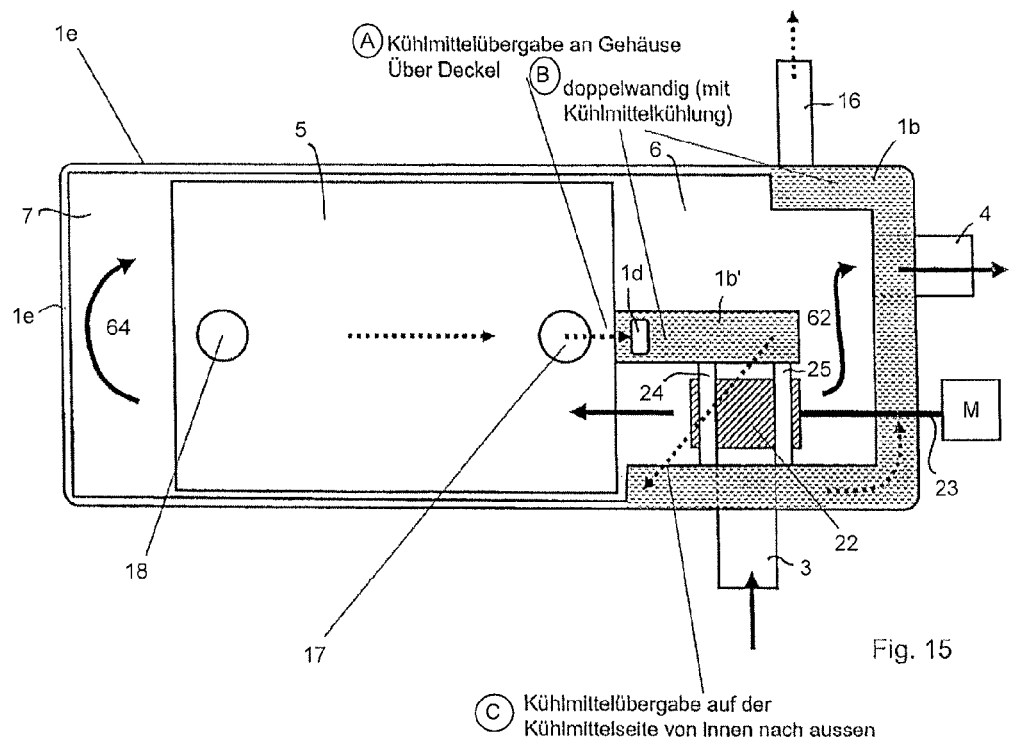
FIG. 15 shows a gas-side top view—similar to the one provided in FIG. 1, 4 or 8, for an additional embodiment according to the second variant of the invention, in which the cooler is operated in U-flow.
Figure 17:
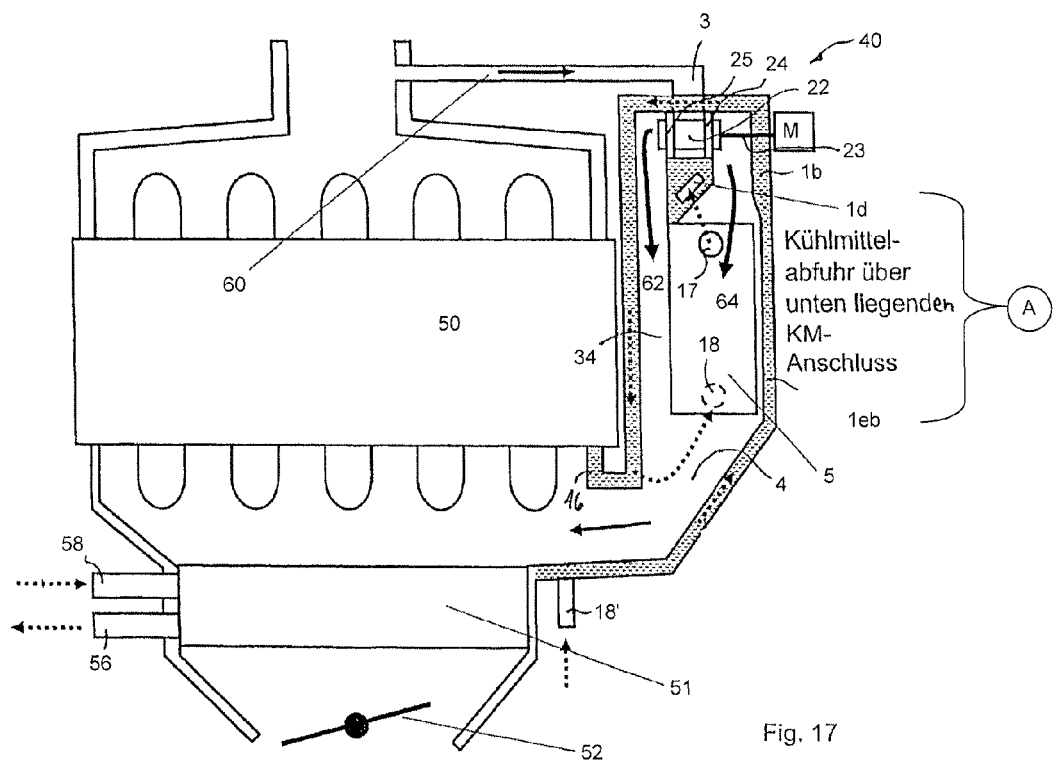
FIG. 17 shows schematically a complete intake module, into which, in the right part, an exhaust gas cooler is installed, and, in the bottom part, a coolant-cooled charge air cooler, and where cooled wall areas are represented with broken lines.

FIG. 15 schematically shows an additional embodiment of a device according to a second variant of the invention. This device, similar to an embodiment depicted in FIG. 17, is for cooling the gas flow 60 of an internal combustion engine 50, which can be implemented, in the context of an intake module 40 for an internal combustion engine 50.

Figure 8:
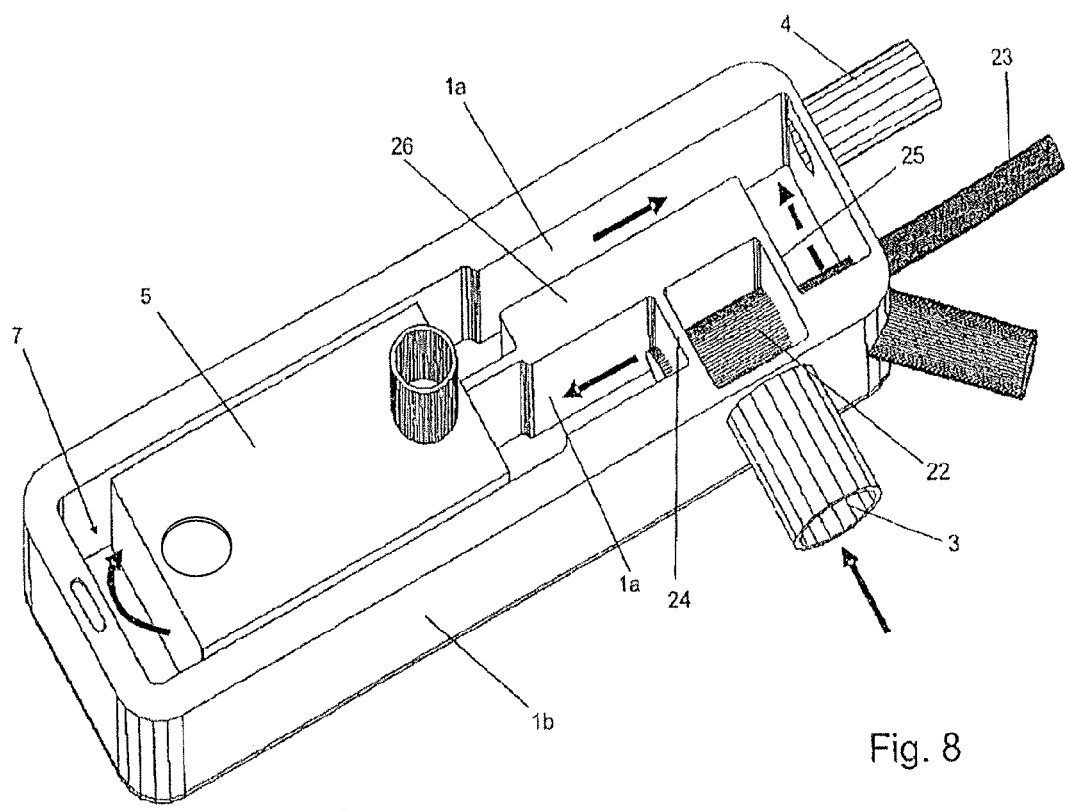
FIG. 8 shows a spatially open view of the embodiment example of FIGS. 5-7 from a gas side.
Figure 9:
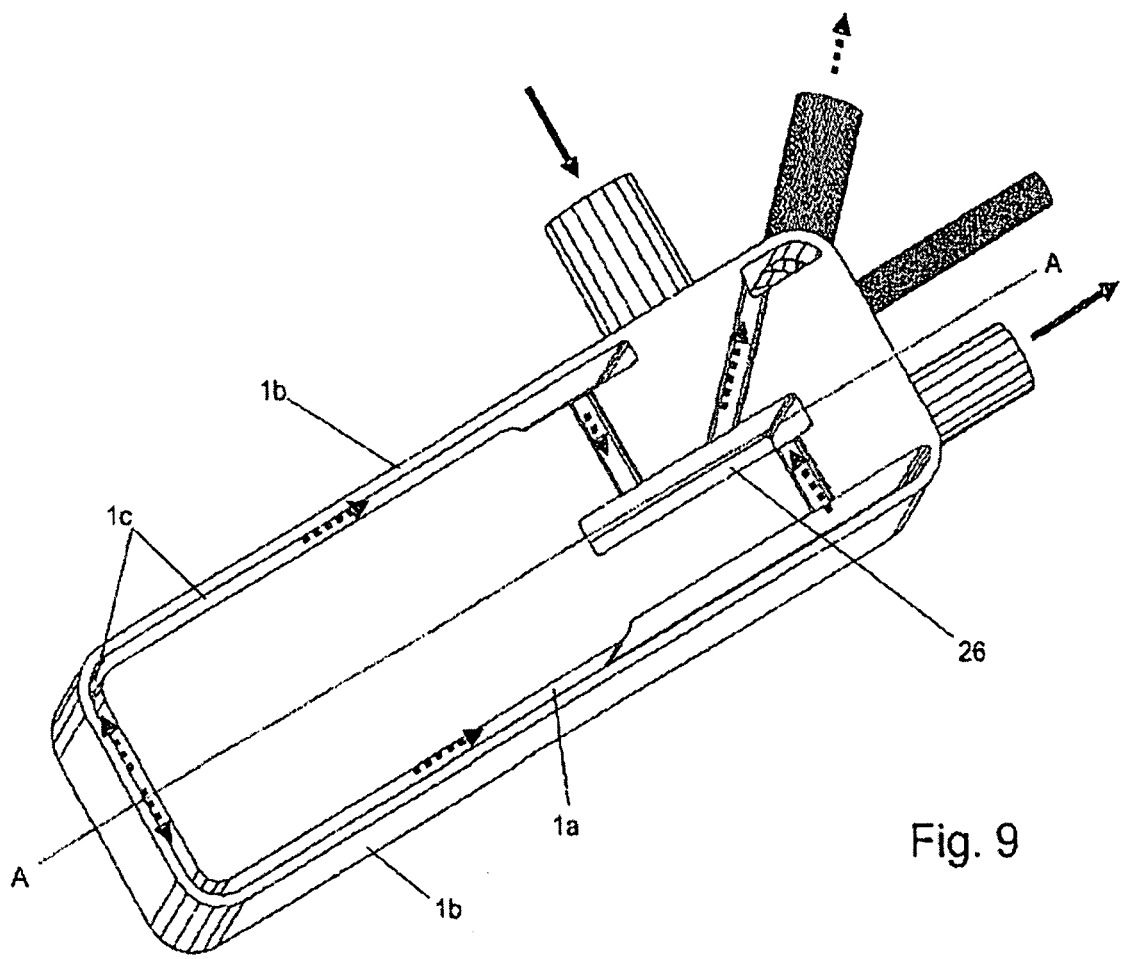
FIG. 9 shows the embodiment example of FIGS. 5-8 in a cut-open view of a coolant side.

In principle, the mode of operation of the module shown in FIG. 15 corresponds to that of a module as shown in FIG. 1, 4 or 8. In particular, similarly to the module shown in FIG. 4 and also to the module shown in FIG. 15, the exchanger means 5, which is designed as a cooler, is operated in a U-flow arrangement.

Figure 16:
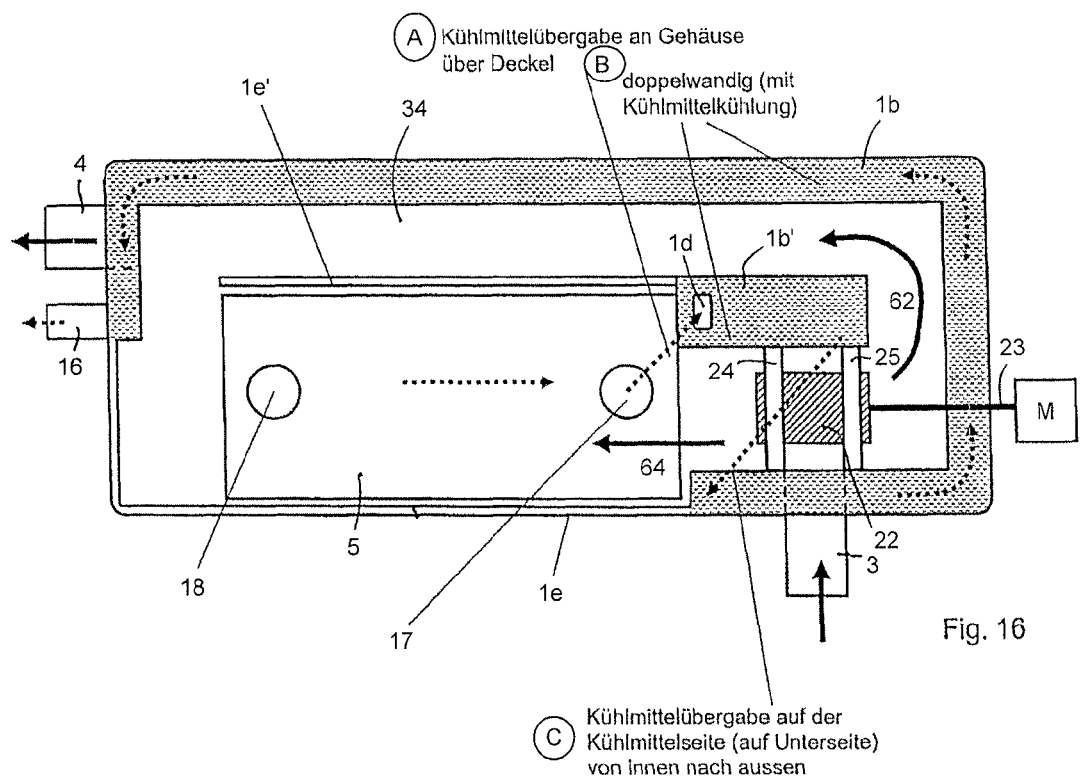
FIG. 16 shows a gas-side top view, as in FIG. 15, of an additional embodiment according to the second variant of the invention, in which the cooler is operated in I-flow mode.

Both FIGS. 15 and 16 show, for this purpose, only a gas-side mold removal side of the housing 1, similarly to FIGS. 1, 4 and 8. FIG. 16, with otherwise identical functioning mode, shows the arrangement of an exchanger means 5 designed as a cooler, which in the module is in an I-flow arrangement. In addition, a bypass 34 is implemented, which can be shielded from the exchanger means 5 by a partition wall 1e' that is provided optionally in FIG. 16. Otherwise, in FIGS. 15-17, parts that have identical function are provided with identical reference characters, and, as already indicated in reference to the above-explained embodiment examples, coolant flows are symbolized with dotted arrows, and gas flows with arrows drawn in solid lines.

In particular, coolant is transferred to the housing via the cover between the opening 17 and the duct 1d. The coolant for the area 1b', which is located inside, is transferred from the inside to the outside on the coolant side, which, in the embodiment shown in FIGS. 15 and 16, is arranged on the bottom side of the housing.

The above-explained embodiment examples according to the first variant of the invention provide for designing the first wall section 1a and particularly also the second wall section 1b of the housing 1 or of a housing part in the form of a cooled wall section. In contrast, the embodiment examples according to the second variant of the invention, explained in the context of FIGS. 15 and 16, provide for only a part of the housing wall that is located on the outside to be cooled with coolant, and, in practice, only those wall areas that come in contact with comparatively hot exhaust gas are cooled. Accordingly, the second wall section 1b in the embodiment examples shown in FIGS. 15 and 16 forms only a first partial area, namely in the partial area represented with dotted lines, except for areas of the inlet 3 and outlet 4 of the gas to be cooled 60, an external housing wall of a housing part and/or of a housing 1. The partial area represented with a broken line in FIGS. 15 and 16 is restricted substantially to those areas of the housing part and/or of the housing 1 that are in contact with relatively hot and uncooled gas. In this case, this is in the inlet area of the right side shown in FIGS. 15 and 16 and/or in the bypass area on the left side shown in FIGS. 15 and 16, of the housing part and/or of the housing 1. In addition, a section 1b' of the second wall section 1b is arranged in a position inside the housing.

Both in the module implemented in the U-flow design of FIG. 15, and also in the module implemented in the I-flow design of FIG. 16, the housing—or the gas-side housing section shown in this instance—is provided, according to the second variant of the invention, with a third, uncooled wall section 1e, which has, in an additional, second partial area represented with solid lines, an external housing wall of the gas-side housing part or of the housing 1 shown there. The second partial area is, as is evident from FIGS. 15 and 16, limited to those areas of the housing part that are in contact with comparatively cooler gas or cooled and/or partially cooled gas—such as, for example, the deflection area 7 or areas that are located adjacent to the exchanger means 5. In contrast, an area that is arranged adjacent to the bypass, as shown in FIG. 16, is provided with a second wall section 1b as a cooling area. The second wall section 1b and the third wall section 1e together form practically completely an external housing wall of the gas-side housing part shown in this instance—of the housing 1 or in the case of an embodiment analogous to FIG. 1. The optional partition shown in FIG. 16 is thus designed as a section 1e'—located inside the housing—of the third wall section 1e.

It has been found that, in the embodiments shown in FIGS. 15 and 16, without additional weight increase, the cooled wall areas—i.e., the wall sections 1b that are represented with broken lines—can be designed according to the second variant of the invention with a considerably increased wall thickness in comparison to the uncooled wall areas, namely the areas of the third wall section 1e. In addition, the additional implementation of the embodiments that are not shown here allows the design of a cooled wall section 1b, in contrast to an uncooled wall section 1e, in a particularly advantageous manner in accordance with the application.

FIG. 17 shows a possibility where a module implemented with an I-flow design—for example, a module of FIG. 16—can be integrated into an intake module 40. For this purpose, an exhaust gas flow 60 that is recycled from the engine is guided through a gas inlet 3 to the module, and then conveyed further, as described in the above-explained embodiments of the first and second variants. In this instance, the wall sections 1b that are designed with a double or thick wall for cooling are again represented with broken lines. In the context of the embodiment shown in FIG. 17, they include practically all the wall sections located outside of the housing. Nevertheless, in accordance with the concept of the second variant of the invention, a section 1e that is shown as the third wall section in FIG. 16—labeled wall section 1eb in FIG. 17—is designed to have a thinner wall than the second wall section 1b. This shows clearly that, in the context of a teaching mediating between the first variant and the second variant of the invention, a wall section 1eb for a comparatively less extensive cooling can be provided, in comparison to a second wall section 1b. The wall section 1eb is nevertheless a cooled wall section in comparison to the uncooled third wall section 1e.

Moreover, a coolant-cooled charge air cooler 51 is arranged in the lower area, in the intake module 40 shown in FIG. 17; it can be fed with charge air via a throttle valve 52, and coolant can be conveyed to or from it via an inlet 58 or an outlet 56, respectively.

In a manner similar to FIG. 8, a cylindrical slide valve 22, which can be actuated via a push rod 23 and a drive system M, is also implemented in the embodiments represented in FIGS. 15 and 16, so that the gas is guided either through a bypass path 62 or a cooling path 64. It should be understood that the individual characteristics of different embodiment examples that have been described can be combined with each other as appropriate, depending on the requirements.

The invention claimed is:

1. A device for cooling a gas flow of an internal combustion engine, comprising
    a metal housing comprising a first wall section and a second wall section;
    the housing further comprising first surface facing a first direction and a second surface facing a second direction, the second direction being opposite to the first direction,
    said first surface having a gas flow channel surrounded by the first wall section,
    said second surface having a cavity between the first wall section and the second wall section, a liquid coolant flowing through the cavity on said second surface,
    said housing further comprising at least one cover part that is not integrally formed with the first and second wall section;
    a duct conveying the coolant arranged in the cover part;
    wherein the cover part comprises two plate-like elements that are arranged on top of another, and the duct is formed by a recess in at least one of the plate-like elements;
    an inlet and an outlet for the gas flow to be cooled, wherein the gas flow comprises at least one of exhaust gas and charge air of the internal combustion engine;
    an inlet and an outlet for the liquid coolant;
    a heat exchanger for heat transfer between the gas flow and the coolant;
    a side cover disposed adjacent to the first wall section, wherein the side cover includes a plurality of deflection bars disposed such that the liquid coolant is deflected at multiple locations;
    wherein the first wall section is arranged between the coolant and the gas flow and wherein a first side of the first wall section is in direct contact with the coolant and a second side of the first wall section is in direct contact with the gas flow, the first and second sides of the first wall section being parallel to each other and are facing opposite directions,
    and
    the second wall section is arranged between the coolant and the atmosphere surrounding the metal housing and wherein a first side of the second wall section is in direct contact with the coolant and a second side of the second wall section is in direct contact with the atmosphere surrounding the metal housing, the first and second sides of the second wall section being parallel to each other and are facing opposite directions; and
    wherein the first wall section and the second wall section are materially integrally formed in one piece.

2. The device according to claim 1, wherein the housing comprises the first and the second wall section comprises a die-cast part.

3. The device according to claim 1, wherein the cover part comprises a seal for sealing off at least one of the coolant and the gas.

4. The device according to claim 1, wherein the cover part is soldered to the housing.

5. The device according to claim 1, wherein at least the inlet or the outlet for the coolant is arranged on the cover part.

6. The device according to claim 1, wherein at least part has an overflow opening connecting the duct to the housing.

7. The device according to claim 1, wherein the heat exchanger is formed as a stack of disks, and the stack is capable of allowing the coolant to flow through the heat exchanger and the gas to flow around the heat exchanger.

8. The device according to claim 1, wherein the heat exchanger comprises a tube bundle.

9. The device according to claim 1, wherein a valve member for the adjustable regulation of a total amount of gas flow is arranged in the housing.

10. The device according to claim 9, wherein a deflection of the gas flow through the heat exchanger or a bypass path is adjustable via the valve member.

11. The device according to claim 1, wherein the first wall section is entirely located inside the housing.

* * * * *